(No Model.)  2 Sheets—Sheet 1.

E. P. CLARK.
CONSTANT CURRENT DYNAMO.

No. 458,618.  Patented Sept. 1, 1891.

WITNESSES:

INVENTOR
Ernest P. Clark
BY
Attorney.

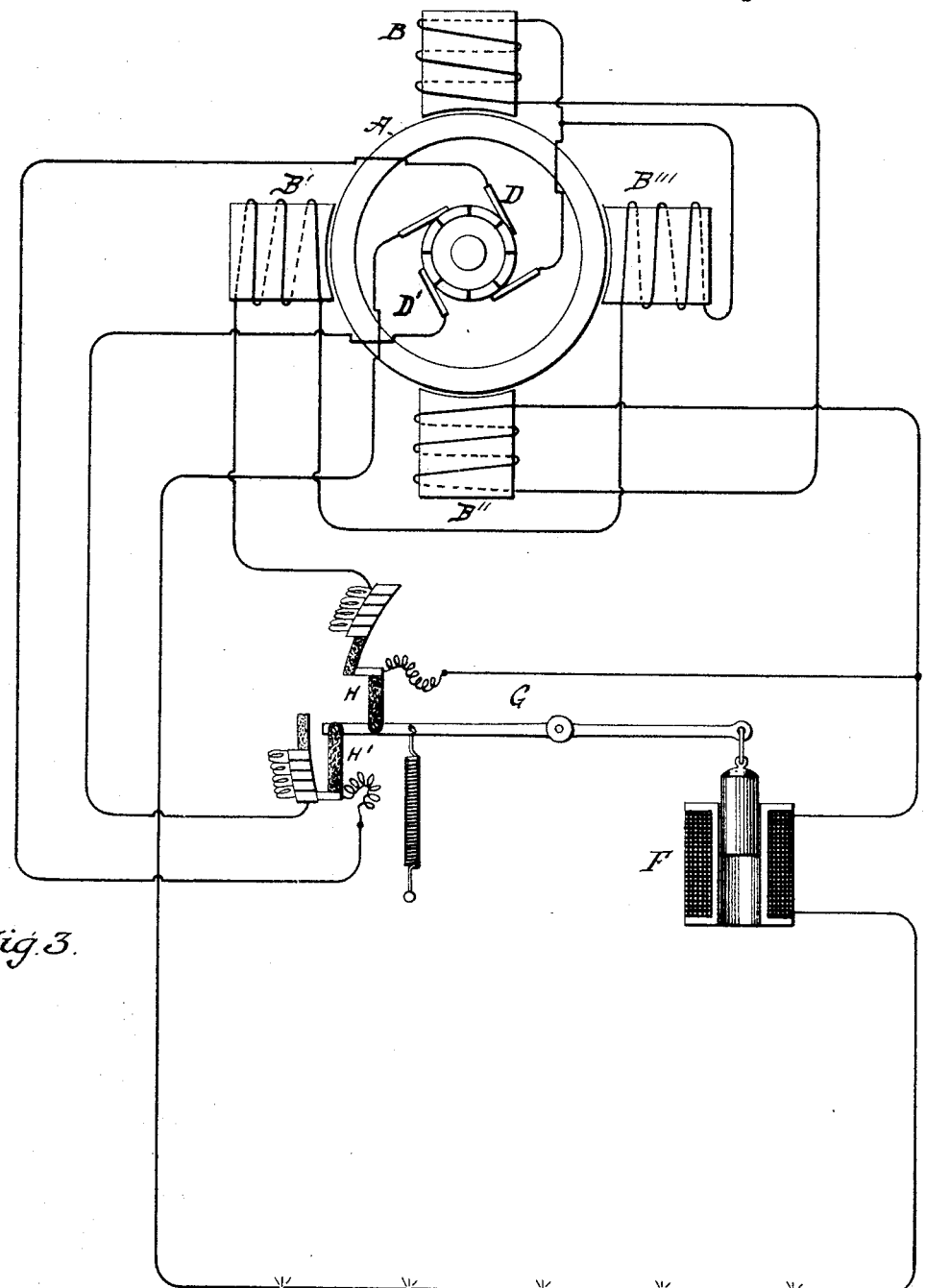

UNITED STATES PATENT OFFICE.

ERNEST P. CLARK, OF NEW YORK, N. Y., ASSIGNOR TO THE CLARK ELECTRIC COMPANY, OF SAME PLACE.

CONSTANT-CURRENT DYNAMO.

SPECIFICATION forming part of Letters Patent No. 458,618, dated September 1, 1891.

Application filed October 4, 1890. Serial No. 367,104. (No model.)

*To all whom it may concern:*

Be it known that I, ERNEST P. CLARK, a citizen of the United States, residing at New York, in the county of New York and State of New York, have invented certain new and useful Improvements in Constant-Current Dynamos, of which the following is a specification.

In the operation of arc lamps in series or in any of the various systems of electric distribution where the translating devices are connected in series it is of the utmost importance that the current shall be maintained at a constant value, irrespective of any changes in resistance which may occur. In order to accomplish this result, the electromotive force of the dynamo must be varied exactly as the resistance in circuit with it varies. As no dynamo heretofore constructed has been able to produce this varying electro-motive force without changes in its adjustment, numerous automatic devices or regulators have been devised the object of which is to readjust the dynamo and so cause it to produce the desired electro-motive force to maintain the current constant while the resistance of the line and translating devices varies within wide limits. These devices, all of which are more or less complicated, vary widely in their construction, but all depend upon one or the other of two general principles—to wit, changing the magnetic power of the field-magnets of the dynamos or changing the position of the collecting-brushes with reference to the "diameter of commutation" of the armature. The latter method (which I will refer to again) is by far the most usual; but while effectual in accomplishing the desired result it is rather too slow in action, owing to the purely mechanical nature of its construction, to provide safe regulation for those sudden and violent changes which occur in practice. It is this defect which has caused inventors to seek for other means of regulation by which, the principles being electrical rather than mechanical, the regulation was expected to be accomplished in less time than is required to move a pair of collector-brushes.

In my machine, hereinafter described, and illustrated in the accompanying drawings, a new principle of regulation is introduced, which consists in rotating the diameter of commutation in the armature with reference to the brushes, which remain stationary.

Figure 1:
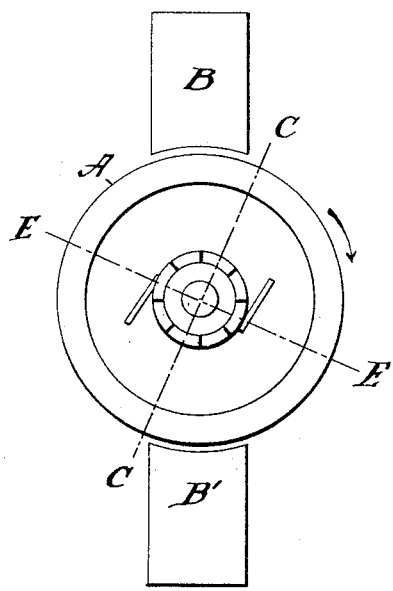
Figure 2:
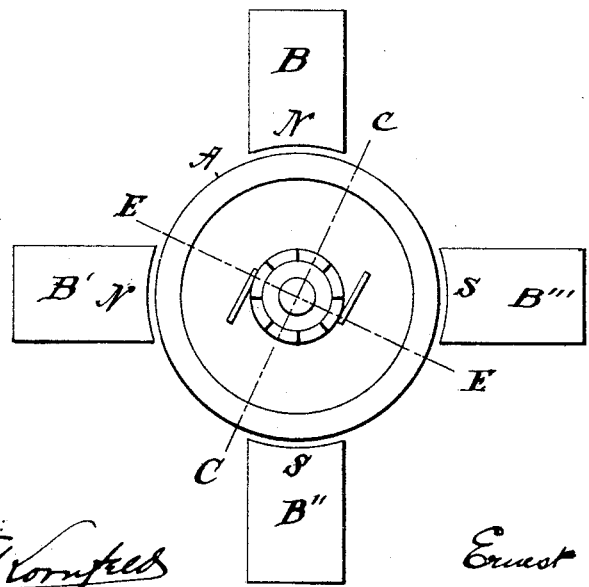

In the drawings above referred to, Figure 1 is a diagrammatic view illustrating the method of regulation by moving the brushes. Fig. 2 is a diagrammatic view of one construction of means for carrying out my improved method, and Fig. 3 illustrates in diagram and elevation magnetic mechanism for operating the variable resistance.

Similar reference-letters indicate similar parts in the several views.

Referring to the drawings, I will now proceed to describe the method by which I accomplish the object of my invention.

A, Fig. 1, represents an ordinary ring-armature located between the pole-pieces B B'. If now the armature be rotated in the direction of the arrow and a certain strength of current, which I will term the "normal strength," be allowed to flow through it by means of its brushes and commutator, the result of the magnetic forces of the poles and the current in the armature will be to produce consequent poles in the armature on the line C. If now the collector-brushes touch the surface of the commutator at points corresponding to the line E, which is at or nearly at a right angle to line C, and at the same time the normal current is allowed to flow in the armature, the two brushes will be subjected to the greatest difference of potential which the armature can produce. If now the brushes be rotated about the axis of the armature until they touch the surface of the commutator at points represented by the line C, (the normal current still being maintained,) there will be no difference of potential between the brushes, and a conductor uniting them would receive no current whatever. Any electro-motive force required within the limits of the capacity of the machine may in this manner be obtained by placing the brushes in the proper position between the position on line E, at which point full electro-motive force is found, and the position on line C, in which position no electro-motive force is found. This is the method of regulation by moving the brushes. Now it is evident that if regulation can be accomplished by shifting the brushes with regard to a fixed consequent polar line in the armature it will be as certainly accomplished if means can be found to shift the consequent polar line of the armature with reference to a fixed pair of brushes, and such means I have devised. Another action in the dynamo must be noted, however, which is as follows: If the brushes be moved in either direction from the line E, the electro-motive force will be reduced; but if the direction of the movement be opposite to that in which the armature is rotating the brushes will be liable to very serious sparking, while if moved forward or in the same direction in which the armature is rotating no such action occurs in a properly-constructed machine. From this it is evident that if the consequent polar line in the armature is to be shifted with reference to a fixed pair of brushes for the purpose of reducing the electro-motive force it must be rotated backward toward the line E and the brushes, or in the opposite direction to that of the armature's rotation, in order to avoid sparking.

In the foregoing explanation I have used the term "consequent polar line" to designate those points in the rotating armature which are at the same potential, or, in other words, those points which, if united by brushes and a wire connecting, would cause no current to pass in the said wire. It will of course be understood that the "diameter of commutation" or the line uniting those points on the armature between which the greatest difference of potential exists is to be found nearly at right angles or ninety degrees from the consequent polar line, and that the act of shifting or rotating the one also involves shifting or rotating the other.

Various means may be devised for producing this rotation or shifting of the consequent polar line and diameter of commutation, and I do not limit myself to any particular method of accomplishing that result, the essential point of my invention being that the diameter of commutation shall be shifted with reference to the brushes which remain fixed, and that the said shifting shall be accomplished automatically for the purpose of maintaining a constant current with varying electro-motive force. The following is a description of one means for accomplishing this result; but others might easily be devised:

In Fig. 2, A represents a ring-armature revolving between the pole-pieces B B′ B″ B‴, the direction of rotation being as indicated by the arrow. The poles B B″ constitute the field of force in which the armature revolves and are in this case excited by coils through which the current passes on its way to the lamps or other translating devices. Poles B′ B‴ are what I term "deflecting-poles," their object being when excited to rotate or deflect the consequent polar line and the diameter of commutation from the position which they normally occupy when poles B B″ only are excited. If now the machine as shown be put in operation in the usual manner, the poles B B″ being excited in the direction indicated by their letters N and S, the armature being traversed by the normal current, and the poles B′ B‴ remaining neutral or not excited, the consequent polar line of the armature will appear at or about the position marked C, and the diameter of commutation or line uniting the points on the commutator where the greatest difference of potential exists will be found at about the position marked E. If now the collector-brushes are placed in contact with the commutator, as shown, on opposite sides at line E, they will receive the full difference of potential existing in the armature at the time. In this condition the machine is in effect an ordinary dynamo and operates exactly as do other machines of its class.

If it is desired to reduce the electro-motive force because of the resistance in circuit having been decreased, I accomplish that result as follows: When the resistance in the working circuit diminishes, the strength of the current will increase. This increase of current, acting upon a magnetic device, allows a certain graduated current to flow in the coils surrounding the cores of pole-pieces B′ and B‴, exciting those poles to a greater or less degree, according to the strength of current sent through their coils. The polarity of the pole-pieces B′ and B‴ is in the direction indicated by their letters N and S. The effect of developing this new polarity at right angles to the first mentioned is to deflect or rotate the consequent polar line and the diameter of commutation backward, or in the opposite direction to the rotation of the armature, and as the brushes are allowed to remain fixed in their original position they will no longer receive the full difference of potential existing in the armature, for the reason that line E or the diameter of commutation has receded from them and line C or the consequent polar line has approached them. If still more current is sent through the coils of poles B′ and B‴, their magnetic power increasing will still further deflect or rotate the diameter of commutation and the consequent polar line, until finally the consequent polar line C will approach nearly to the position formerly occupied by line E, while line E will be found at or nearly at the position formerly occupied by line C. In this condition there will be no difference of potential between the fixed brushes, and a conductor uniting them will receive no current. If now the current in the coils of poles B′ and B‴ is gradually lessened, the magnetic power of those poles becomes less, and lines C and E will advance in the direction of rotation of the armature toward their original positions, and the electro-motive force at the fixed brushes will rise in proportion to the advance of the lines C and E.

The current for exciting the coils of poles

B' and B''' may be derived from the main current in any convenient way; but I prefer to connect poles B' and B''' with a variable resistance, as a shunt, to the coils B and B'', for I find it necessary in practice to send less than ten per cent. of the whole current through the coils of poles B' and B''' to reduce the electro-motive force at the brushes nearly to zero. This ten per cent. of the current being diverted from coils B and B'' does not materially weaken them, and as they are still highly magnetized the machine can quickly resume the full load if it be suddenly thrown on.

The particular magnetic arrangement I employ to operate the variable resistance I intend to make the subject of another application for patent, and will not describe it herein. Any convenient arrangement will answer, and I illustrate a simple form in Fig. 3, which also shows diagrammatically the arrangement of circuits as I have described them above.

Another important feature which I have discovered in this machine is as follows: If poles B and B'' only are excited and the brushes, which I will term the "main brushes," touch the commutator on line E, they will receive the full electro-motive force of the armature. If another pair of brushes, which I will term "auxiliary brushes," be allowed to touch the surface of the commutator at points slightly in advance of the line C, they will receive a slight difference of potential, and a conductor uniting the auxiliary brushes will be traversed by a small current. This current will be very small, owing to the slight electro-motive force and the resistance and self-induction of the armature-coils; but it has a most important effect upon the machine, as it increases the electro-motive force at the main brushes at times as much as twenty-five per cent., and of course augments the working power of the machine by that amount. If a graduated resistance be introduced in this auxiliary circuit, the electro-motive force at the main brushes may be reduced by increasing the said resistance until when the resistance becomes infinite the machine is in the same condition as before the auxiliary brushes were applied. Therefore the action in my machine as I have constructed it is as follows: For full electro-motive force the poles B and B'' are excited, poles B' and B''' are neutral, and the auxiliary brushes D and D', Fig. 3, are connected by a conductor of very slight resistance. Now to decrease the electro-motive force of the machine I proceed as follows: first, a resistance is introduced in the auxiliary circuit, and this resistance is increased until it is infinite, and, secondly, a current is sent through the coils of poles B' and B''', rotating the diameter of commutation backward, this current being increased until the electro-motive force at the main brushes is reduced to zero, if so great a reduction is desired. The means I use to effect these changes are shown diagrammatically in Fig. 3, in which F represents a solenoid whose coil is traversed by the main current and exerts an attractive force upon its core, varying with the strength of current flowing in the solenoid. Attached to the lever G, but insulated therefrom, are two sliding contacts H and H', connected to the circuits, as shown, by flexible conductors. These sliding contact-pieces or trailers are intended to move by the action of the solenoid over the two series of contact-pieces, as shown, for the purpose of varying the resistance of the two circuits, as previously described, H being located in the circuit that includes the coils of the deflecting-poles, while H' is included in the auxiliary circuit. In this arrangement it is essential that in the movement of the contacts H and H' contact H' shall open or break its circuit completely before contact H is in connection with the first of its series of contact-pieces, as otherwise sparking is induced at the auxiliary brushes and the machine becomes unsteady in its action. This arrangement of the solenoid, lever, and sliding contacts will, if properly proportioned and constructed, accomplish the regulation of the dynamo as described, but is not, as above stated, the arrangement I prefer in practice. The actual means that I prefer for this purpose is quite different in construction, but the same in effect, and as I intend to make it the subject of a future application for Letters Patent it is not introduced herein.

In the foregoing description and the drawings the deflecting-poles B' and B''' are represented as being approximately the same in size and power as those of the main field B and B''; but this is not at all necessary, and they may with advantage be considerably smaller. In fact, the whole arrangement of machine, as described, may be modified in numerous details without departing from the spirit of my invention, as I do not limit myself to any particular form of construction of dynamo in carrying out my invention, the essential point and the point which I claim being the system of regulation by shifting or rotating the consequent polar line and the diameter of commutation with reference to a fixed and stationary set of brushes for the purpose of maintaining an approximately constant current with varying electro-motive force.

Having now described my invention, what I claim is—

1. A dynamo-electric machine having field-magnets to produce its field of force, deflecting-magnets to deflect the magnetic line and diameter of commutation in the armature, and auxiliary brushes touching its commutator on opposite sides at points on or slightly in advance of the normal position of the line of equal potential.

2. A dynamo-electric machine having field-magnets to produce its field of force, deflecting-magnets to deflect the magnetic line and diameter of commutation in the armature, and auxiliary brushes touching the commutator on opposite sides at points on and slightly in advance of the normal position of the line of equal potential and being connected by a conductor.

3. A dynamo-electric machine having field-magnets to produce its field of force, deflecting-magnets to deflect the magnetic line and diameter of commutation in the armature, and auxiliary brushes touching the commutator on opposite sides at points on or slightly in advance of the normal position of the line of equal potential and being connected by a conductor including an adjustable resistance.

In witness whereof I have hereunto signed my name in the presence of two subscribing witnesses.

ERNEST P. CLARK.

Witnesses:
FRANK S. OBER,
WM. A. ROSENBAUM.